(12) United States Patent
Tomoda

(10) Patent No.: US 7,477,989 B2
(45) Date of Patent: Jan. 13, 2009

(54) NAVIGATION APPARATUS

(75) Inventor: Takahisa Tomoda, Zama (JP)

(73) Assignee: Xanavi Informatics Corporation, Zama-shi (JP)

( * ) Notice: Subject to any disclaimer, the term of this patent is extended or adjusted under 35 U.S.C. 154(b) by 563 days.

(21) Appl. No.: 11/315,224

(22) Filed: Dec. 23, 2005

(65) Prior Publication Data
US 2006/0161342 A1 Jul. 20, 2006

(30) Foreign Application Priority Data
Dec. 27, 2004 (JP) ............... 2004-376786

(51) Int. Cl.
*G01C 21/00* (2006.01)
*G09B 29/10* (2006.01)
*G08G 1/0962* (2006.01)
(52) U.S. Cl. ............... 701/209; 701/201; 701/211; 340/995.13
(58) Field of Classification Search .......... 701/209, 701/201, 210, 211; 455/414.2, 414.3, 414.4, 455/456.2; 340/955.13, 955.19, 955.23
See application file for complete search history.

(56) References Cited

U.S. PATENT DOCUMENTS

| 6,249,720 | B1 * | 6/2001 | Kubota et al. ............... 701/1 |
| 6,385,535 | B2 * | 5/2002 | Ohishi et al. ............... 701/209 |
| 7,035,732 | B2 * | 4/2006 | Hessling et al. ............ 701/209 |
| 7,054,744 | B2 * | 5/2006 | Hirose et al. ............... 701/210 |

FOREIGN PATENT DOCUMENTS

JP 2001-289661 A 10/2001

* cited by examiner

*Primary Examiner*—Tan Q Nguyen
(74) *Attorney, Agent, or Firm*—Crowell & Moring LLP

(57) ABSTRACT

A navigation apparatus includes: a numerical conversion unit that converts information related to a specific suggestion to a numerical value; a suggestion unit that makes the specific suggestion to a user when the numerical value resulting from numerical conversion executed by the numerical conversion unit is greater than a threshold value; an input unit through which a user response to the specific suggestion is input; and an adjustment unit that changes the threshold value in correspondence to contents of the user response input through the input unit.

12 Claims, 10 Drawing Sheets

FIG. 6

| DISTANCE FROM OCEAN | NUMERICAL VALUE (SD) |
|---|---|
| 100m OR LESS | 1 |
| 100~500m | 2 |
| 500m~1km | 3 |
| 1km OR MORE | 4 |

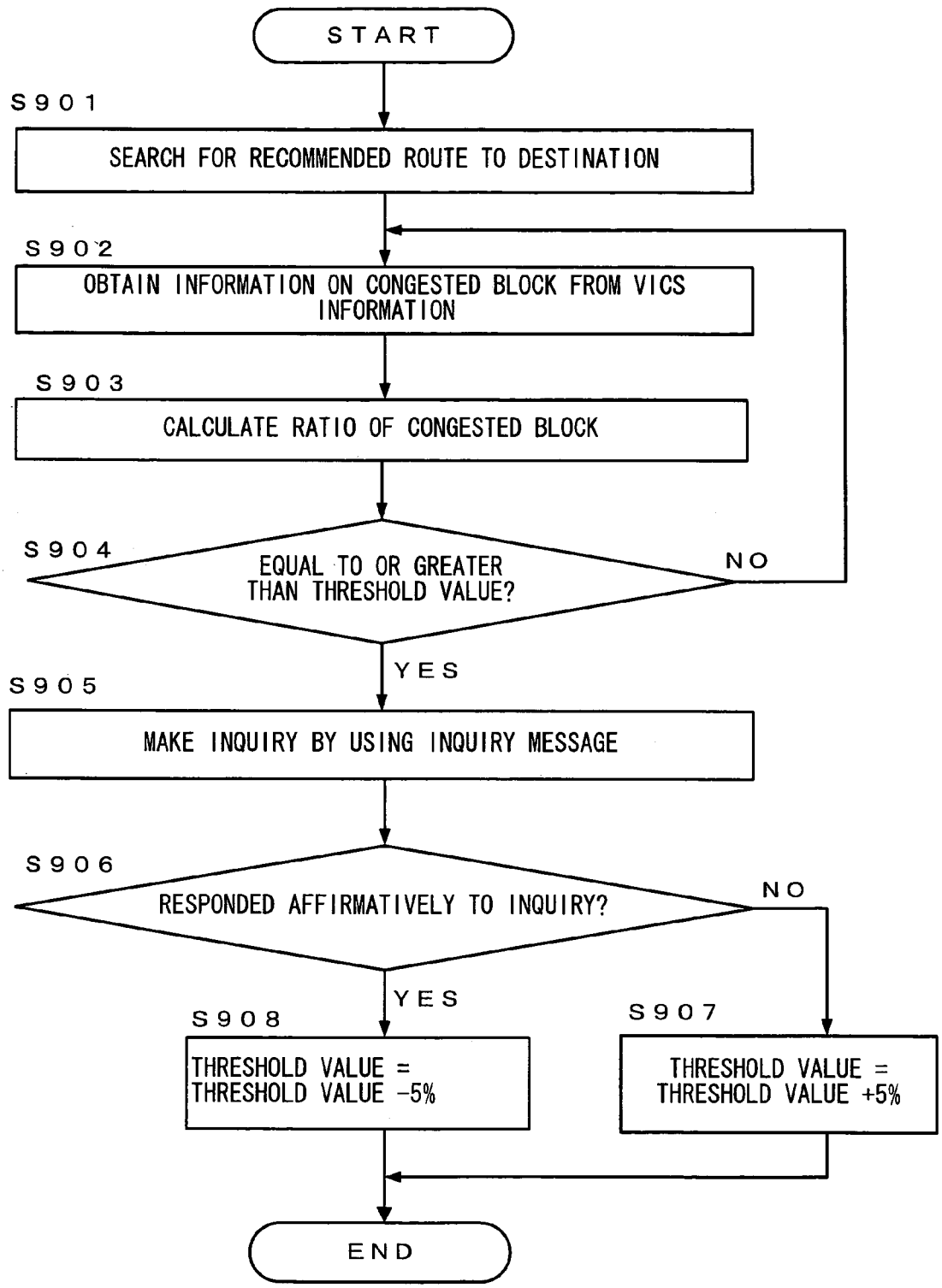

NAVIGATION APPARATUS

INCORPORATION BY REFERENCE

The disclosure of the following priority application is herein incorporated by reference: Japanese Patent Application No. 2004-376786 filed Dec. 27, 2004.

BACKGROUND OF THE INVENTION

1. Field of the Invention

The present invention relates to a navigation apparatus capable of making suggestions to the user based upon various types of information.

2. Description of Related Art

There is a navigation apparatus known in the related art that guesses the driver's intentions from his tone of voice, makes a suggestion with regard to the intentions having been guessed and executes processing corresponding to the contents of the suggestion if the driver agrees to the suggestion (see Japanese Laid Open Patent Publication No. 2001-289661).

SUMMARY OF THE INVENTION

The invention disclosed in Japanese Laid Open Patent Publication No. 2001-289661 has a problem in that since the navigation apparatus guesses the driver's intentions from his voice, it cannot make any guesses if the driver is alone in the car and there is no conversation. In addition, the driver's voice does not always bear direct relevance to his intentions and, for this reason, the navigation apparatus may make suggestions that are far from relevant to the driver's wishes.

According to the 1st aspect of the invention, a navigation apparatus comprises: a numerical conversion unit that converts information related to a specific suggestion to a numerical value; a suggestion unit that makes the specific suggestion to a user when the numerical value resulting from numerical conversion executed by the numerical conversion unit is greater than a threshold value; an input unit through which a user response to the specific suggestion is input; and an adjustment unit that changes the threshold value in correspondence to contents of the user response input through the input unit.

According to the 2nd aspect of the invention, in the navigation apparatus according to the 1st aspect, it is preferred that the adjustment unit adjusts the threshold value to different values in correspondence to an affirmative user response and a negative user response to the specific suggestion.

According to the 3rd aspect of the invention, in the navigation apparatus according to the 1st or the 2nd aspect, it is preferred that: the specific suggestion includes a first suggestion and a second suggestion that is more specific than the first suggestion; and the suggestion unit first makes the first suggestion and makes the second suggestion following the first suggestion.

According to the 4th aspect of the invention, in the navigation apparatus according to any of the 1st through 3rd aspects, it is preferred that the information related to the specific suggestion is at least either of vehicle traveling information and external information transmitted from an external source.

According to the 5th aspect of the invention, in the navigation apparatus according to the 4th aspect, it is preferred that the vehicle traveling information indicates at least either of a distance between the current vehicle position and a specific geographical position and a length of required traveling time to the geographical position.

According to the 6th aspect of the invention, in the navigation apparatus according to the 4th aspect, it is preferred that the external information transmitted from the external source is traffic information, shop information or facility information.

According to the 7th aspect of the invention, in the navigation apparatus according to the 4, it is preferred that: there is further provided a route search unit that searches for a recommended route from a start point or a current position to a destination; the external information is information related to a congested block on the recommended route; the numerical value resulting from the numerical conversion executed by the numerical conversion unit indicates a ratio of the congested block to the recommended route; and the specific suggestion relates to a traffic jam information display providing traffic jam information along the recommended route.

According to the 8th aspect of the invention, in the navigation apparatus according to the 4, it is preferred that: there is further provided a route search unit that searches for a recommended route from a start point or a current position to a destination; the vehicle traveling information indicates a length of time over which the user, who is a driver, has been driving the vehicle; the numerical value resulting from the numerical conversion executed by the numerical conversion unit indicates the length of time over which the driver has been driving the vehicle; and the specific suggestion is a suggestion related to a rest stop on the recommended route.

According to the 9th aspect of the invention, in the navigation apparatus according to the 3rd aspect, it is preferred that the threshold value is adjusted to different values in correspondence to the user response to the first suggestion and the user response to the second suggestion.

According to the 10th aspect of the invention, in the navigation apparatus according to the 2nd aspect, it is preferred that in case that the user gives an affirmative response to the specific suggestion, the adjustment unit changes the threshold value to a smaller value and in case that the user gives a negative response to the specific suggestion, the adjustment unit changes the threshold value to a greater value.

According to the 11th aspect of the invention, in the navigation apparatus according to any of the 1st through 10th aspects, it is preferred that: there is further provided; a response recognition unit that recognizes an extent of rejection when the user gives a negative response to the specific suggestion; and the adjustment unit changes the threshold value to a greater value when the extent of In rejection recognized by the response recognition unit is greater.

According to the 12th aspect of the invention, in the navigation apparatus according to any of the 1st through 11th aspects, it is preferred that there is further provided a manual adjustment unit that allows the user to adjust the threshold value.

BRIEF DESCRIPTION OF THE DRAWINGS

FIG. 6 shows a numerical conversion table;

FIG. 9 presents a flowchart of the traffic jam information display inquiry processing.

DESCRIPTION OF PREFERRED EMBODIMENTS

Figure 1:
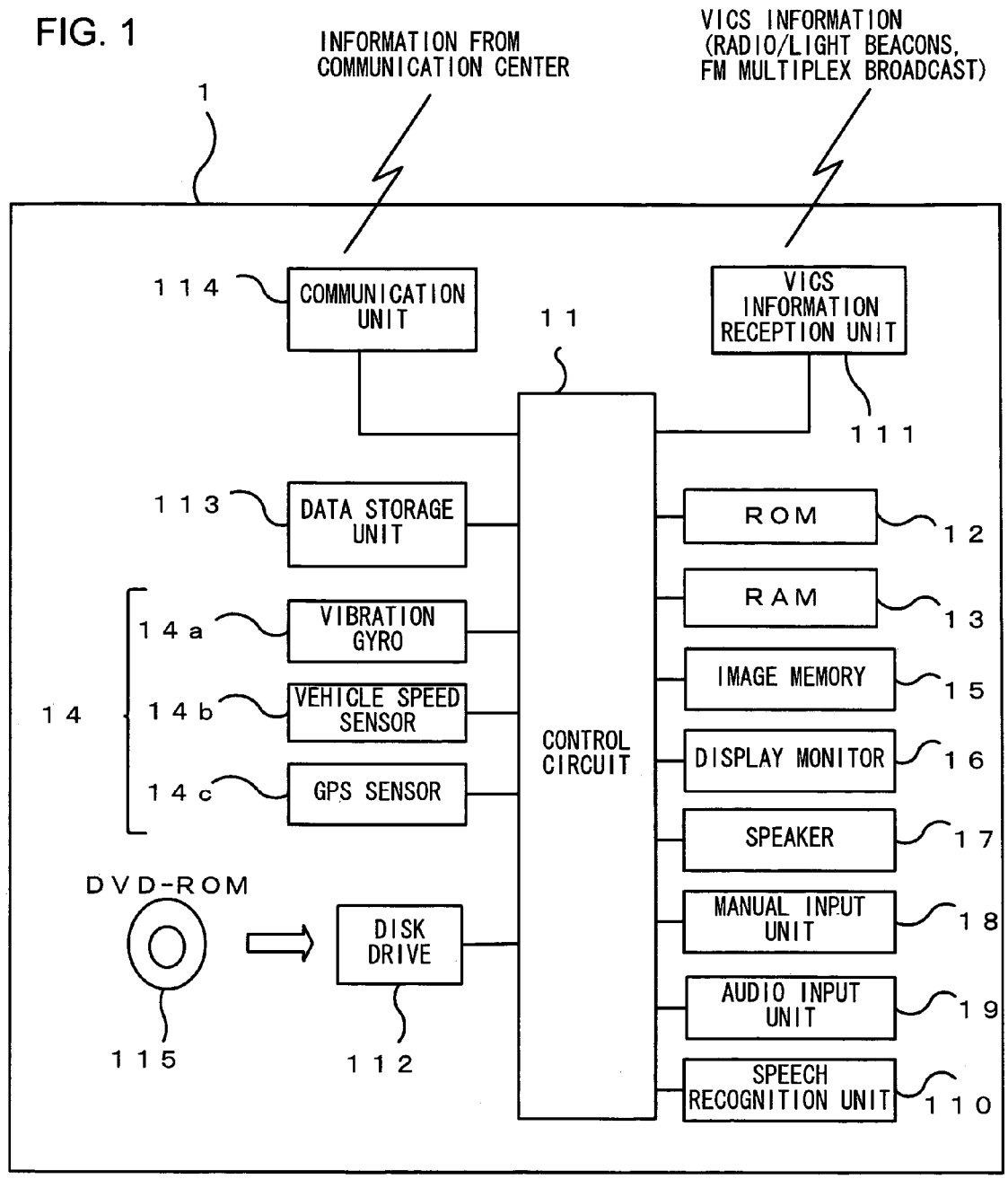
FIG. 1 is a block diagram showing the structure of the navigation apparatus achieved in an embodiment of the present invention.

The structure adopted in the navigation apparatus achieved in an embodiment of the present invention is shown in FIG. 1. In addition to the regular navigation functions including a map display function, the navigation apparatus 1 in FIG. 1 has a speech recognition capability for recognizing the speech of the driver (user) and thus, the navigation apparatus can be operated by voice. It also has a function of providing voice route guidance. The navigation apparatus 1, which is installed in a vehicle, comprises a control circuit 11, a ROM 12, a RAM 13, a current position detection device 14, an image memory 15, a display monitor 16, a speaker 17, a manual input unit 18, an audio input unit 19, a speech recognition unit 110, a VICS information reception unit 111, a disk drive 112, a data storage unit 113 and a communication unit 114.

A DVD-ROM 115 having recorded therein map data is loaded into the disk drive 112. The map data include map display data, route search data and the like. The map display data include map data provided in a plurality of scaling factors, from a wide area map to a detailed map, and the scaling factor of the map on display can be adjusted in the navigation apparatus 1 achieved in the embodiment in response to a request from the driver. In addition, the map data include road data indicating road types and names and store data containing information indicating the positions, the names and the like of convenience stores, gas stations, family restaurants and the like. Also, road data corresponding to a road running near the seaside (e.g., a road passing within the range of 2 km from the shoreline) include data indicating the average distance from the shoreline (the distance from the sea) as part of link information provided in correspondence to each link.

The control circuit 11, which is constituted with a microprocessor and its peripheral circuits, executes various types of control by executing in a work area constituted of the RAM 13 a control program stored in the ROM 12. The current position detection device 14, which detects the current position of the vehicle, may comprise a vibration gyro 14a that detects the advancing azimuth of the vehicle, a vehicle speed sensor 14b that detects the vehicle speed, a GPS sensor 14c that detects a GPS signal from a GPS satellite and the like. Based upon the current position of the vehicle detected by the current position detection device 14, the navigation apparatus 1 is able to set a display range and a route search start point, and it also indicates the current position on the map.

In the image memory 15, image data to be displayed at the display monitor 16 are stored. The image data, which are constituted with road map drawing data used to display a map image, various types of graphic data and the like, are generated as needed based upon the map data recorded in the DVD-ROM 115 read by the disk drive 112. A map and the like can be brought up on display at the navigation apparatus 1 by using the image data thus generated.

At the display monitor 16, information needed in navigation is displayed. Based upon various types of information such as the map data, various types of information including a map of an area around the subject vehicle position are provided to the driver as a screen display. The information needed to navigate the vehicle is also provided as an audio output through the speaker 17.

The manual input unit 18, which includes an input switch operated by the driver to set a destination for the vehicle, may be realized in the form of a touch panel on an operation panel, some other type of operation switches, or a remote-control device. The audio input unit 19 includes a microphone through which the operator's voice is input. Prompted by instructions on the screen brought up at the display monitor 16 or audio instructions output through the speaker 17, the driver operates the navigation apparatus 1, e.g., sets the destination, by operating the manual input unit 18 or inputting voice instructions through the audio input unit 19. The speech recognition unit 110 analyzes and recognizes the speech input through the audio input unit 19.

As the driver sets the destination, the navigation apparatus 1 executes an arithmetic operation to determine a route to the destination from a start point set at the current position detected by the current position detection device 14 based upon a specific algorithm. The route thus determined (hereafter referred to as the recommended route) is indicated on the screen display as distinct from other roads by adopting a different display mode, e.g., by using a different display color. Thus, the driver is able to distinguish the recommended route on the map on display. In addition, the navigation apparatus 1 guides the vehicle along the recommended route by providing the driver with instructions brought up on the screen, audio instructions and the like as the vehicle advances.

The VICS information reception unit 111 receives VICS information such as traffic jam information provided by a VICS information center (not shown) and outputs the received information to the control circuit 11. Such VICS information is transmitted through radio beacons mainly installed on express highways, light beacons mainly installed on regular roads or through FM multiplex broadcast. The navigation apparatus 1 receives the VICS information transmitted via these means at its VICS information reception unit 111.

The disk drive 112 reads out from the DVD-ROM 115 the map data to be used to display a map at the display monitor 16. It is to be noted that the disk drive may read out map data recorded in a recording medium other than the DVD-ROM 115, such as a CD-ROM, or it may be a hard disk drive.

In the data storage unit 113 constituted with a rewritable recording medium such as a semiconductor memory or a hard disk, data needed to achieve the various functions of the navigation apparatus 1 are stored. The information stored in the data storage unit 113 is read out as necessary and used by the control circuit 11. In addition to the data needed to achieve the various functions of the navigation apparatus 1, music files can be stored in the data storage unit. A music file stored in the data storage unit 113 can be output through the speaker 17 and thus, the driver can listen to music stored in the data storage unit 113.

The communication unit 114 receives information transmitted from a communication center (not shown) and outputs the received information to the control circuit 11. The communication unit 114 is also capable of transmitting an output from the control circuit 11 to the communication center. Various types of information are transmitted from the communication center to the navigation apparatus via a wireless means. The information that may be transmitted from the communication center includes, for instance, consumer information introducing a new pastry shop and a rating of the quality of the pastry shop.

Next, suggestions that the navigation apparatus 1 achieved in the embodiment of the present invention may make are explained.

In the embodiment, vehicle traveling information and external information transmitted from an external source are converted to numerical values, and the navigation apparatus makes various suggestions and inquiries to the driver when these numerical values exceed predetermined values (hereafter referred to as threshold values).

Figure 2:
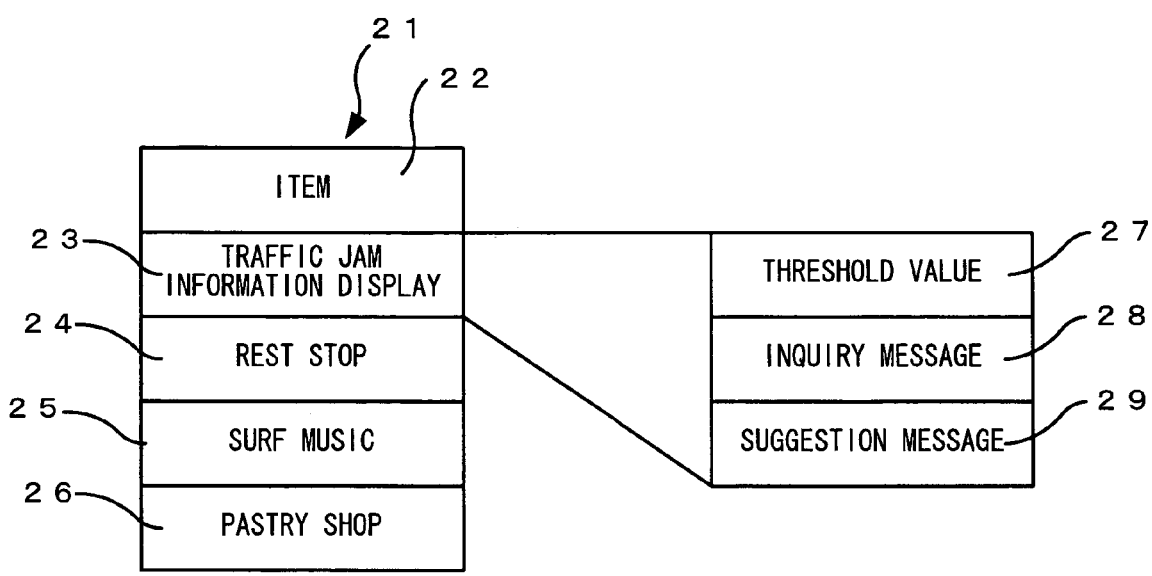
FIG. 2 illustrates the suggestion database stored in the data storage unit.

As shown in FIG. 2, the data storage unit 113 at the navigation apparatus 1 includes a suggestion database area 21 from which the navigation apparatus 1 draws suggestions (hereafter simply referred to as the suggestion database) In the suggestion database 21, data related to "traffic jam information display" 23, "rest stops" 24, "surf music" 25 and "pastry shops" 26 are stored as items 22 with regard to which the navigation apparatus 1 may make suggestions. In correspondence to each of the items 23 through 26, a threshold value 27 used as a reference when making a decision as to whether or not, a suggestion should be made, an inquiry message 28 used when making an audio inquiry related to the suggestion and a suggestion message 29 used when making an audio suggestion are stored as attribute data.

Figure 3:
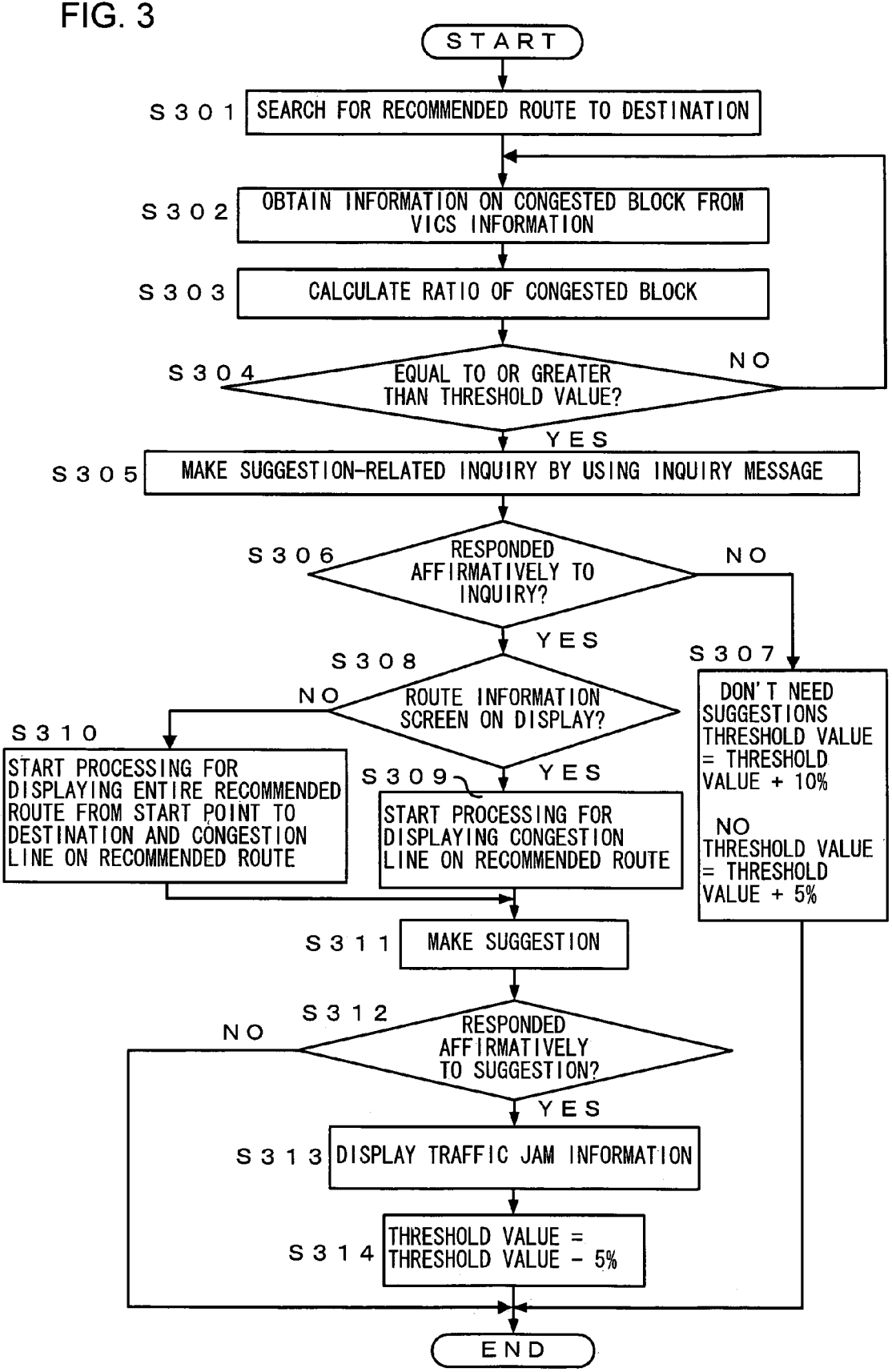
FIG. 3 presents a flowchart of the processing executed to suggest display of traffic jam information.

Next, as an example of the processing executed in the navigation apparatus achieved in the embodiment to make suggestions corresponding to the various suggestion items, traffic jam information display suggestion processing is explained in reference to the flowchart presented in FIG. 3. Through this suggestion processing, the navigation apparatus 1 makes a suggestion and an inquiry with regard to the display of traffic jam information at the display monitor 16 when the traffic on the recommended route to the destination is congested. The suggestion processing is executed by the control circuit in conformance to a suggestion processing program. The suggestion processing in FIGS. 4 through 6, 8 and 9 to be explained later, too, is executed in conformance to similar suggestion processing programs.

In step S301, the navigation apparatus 1 executes a route search, to determine a route from a start point or the current position to a destination and calculates the recommended route: In step S302, it receives VICS information via the VICS information reception unit 111 and obtains information contained in the VICS information, which corresponds to any block on the recommended route where the traffic is congested. In step S303, the ratio (%) of the congested block to the length of the recommended route extending from the start point to the destination is calculated. For instance, this ratio is calculated to be 50% if the recommended route from the start point to the destination extends over a distance of 10 km and the length of the congested block is 5 km.

In step S304, a decision is made as to whether or not the ratio of the congested block calculated in step S303 is equal to or greater than a predetermined threshold value. This threshold value is used as a reference when making a decision as to whether or not the navigation apparatus 1 is to make a suggestion or an inquiry to the driver and it changes in correspondence to the response of the driver to the suggestion or the inquiry made by the navigation apparatus 1. In this example, the threshold value is set at 50%. If the ratio of the congested block is equal to or greater than the threshold value, an affirmative decision is made in step S304 and the operation proceeds to step S305. If, on the other hand, the ratio of the congested block is smaller than the threshold value, a negative decision is made and the operation returns to step S302.

In step S306, the navigation apparatus 1 makes an inquiry related to a suggestion to the driver through an audio message output via the speaker 17. This inquiry is made by using the inquiry message 28 stored in the suggestion database 21. In this embodiment, an audio message "The ratio of the congested block is xx %. Would you like traffic jam information to be displayed?" is output through the speaker 17. It is to be noted that "xx" indicates the numerical value indicating the ratio of the congested block having been calculated in step S303 and is synthesized as speech.

In step S306, a decision is made as to whether or not the suggestion-related inquiry made by the navigation apparatus 1 has received an affirmative response. If the driver gives a negative response such as "don't need suggestions" or "no" via the audio input unit 18 to the inquiry, a negative decision is made in step S306, and the operation proceeds to step S307. It is to be noted that the contents of the driver's speech are analyzed by the speech recognition unit 110, and the recognition results are output to the control circuit 11.

In step S307, the threshold value is changed to a value obtained by adding 10% to the current value if the driver has said "don't need suggestions", or the threshold value is changed to a value obtained by adding 5% to the current value if the driver has said "no". In this step, a smaller value is added to the current threshold value if the driver has simply said "no" instead of "don't need suggestions", since "no" indicates a higher likelihood of the driver responding positively to the inquiry if the ratio of the congested block is slightly higher, compared to the more decisive rejection implied in "don't need suggestions". Once the threshold value is adjusted as described above, no further inquiry related to the traffic jam information display suggestion is subsequently made unless the ratio of the congested block increases. At this time, the traffic jam information display suggestion processing ends. If, on the other hand, the driver gives an affirmative oral response such as "yes" or "okay" to the inquiry, an affirmative decision is made in step S306 and the operation proceeds to step S308.

In step S308, a decision is made as to whether or not the screen currently on display at the display monitor 16 is a route information display screen showing the route from the start point to the destination having been determined through the search. If an affirmative decision is made, the operation proceeds to step S309 to start processing for displaying a congestion line along the congested block on the searched route on display. If, on the other hand, a surrounding area map display screen of an area around the subject vehicle is currently on display at the display monitor 16, a negative decision is made in step S308 and the operation proceeds to step S310.

In step S310, the processing for displaying the searched route extending from the start point to the destination with the congestion line along the congested block starts. The term "congestion line" refers to a line displayed over the congested block on the recommended route. The congestion line displayed through this processing is a red line or a red arrow under normal circumstances. It is to be noted that an orange line or arrow is also displayed along a block on the recommended route where the traffic is not congested but is somewhat heavy and that a green line or arrow is displayed along a block on the recommended route where the traffic is light.

In step S311, the navigation apparatus 1 makes an audio suggestion to the driver through the speaker 17. This suggestion is made by using the suggestion message 29 stored in the suggestion database 21. In this embodiment, an audio message "Do you want route information to be displayed?" is output through the speaker 17.

In step S312, a decision is made as to whether or not the driver has responded affirmatively to the suggestion made by the navigation apparatus 1. If the driver has responded affirmatively by saying "yes", "okay" or the like to the suggestion, an affirmative decision is made in step S312 and the operation proceeds to step S313. During this processing, too, the speech made by the driver is input through the audio input unit 19. In step S313, the recommended route from the start point to the destination, which includes the congestion line indicating the congested block is displayed at the display monitor 16.

In step S314, the threshold value is changed to a value obtained by subtracting 5% from the current value. Once the threshold value is adjusted in this step, the inquiry related to the traffic jam information display suggestion is made subsequently even when the ratio of the congested block is less than the previous threshold value. The traffic jam information display suggestion processing then ends.

If the driver responds negatively by saying "no", "no thanks" or the like to the suggestion made in step S311, a negative decision is made in step S312 and the traffics jam information display suggestion processing ends.

Figure 4:
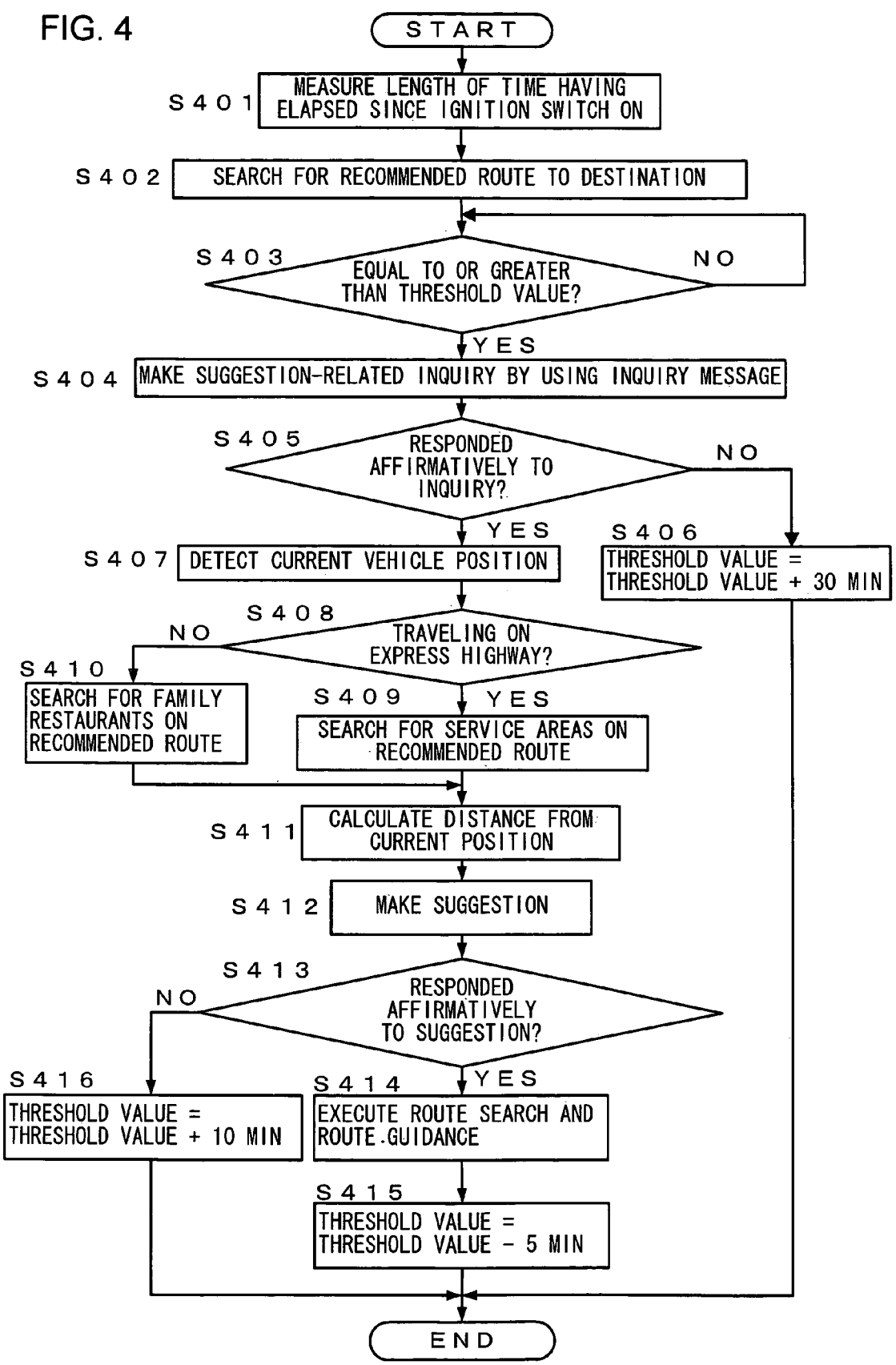
FIG. 4 presents a flowchart of the processing executed to suggest a rest stop.

Next, rest stop suggestion processing is explained in reference to the flowchart presented in FIG. 4. Through this suggestion processing, the navigation apparatus makes a suggestion and inquiry with regard to a rest stop when the driver has been driving for a predetermined length of time. Since the length of time the driver drives the vehicle is substantially equal to the length of time having elapsed after the ignition switch of the vehicle is turned on, the length of time elapsing after the ignition switch is turned on is regarded as the length of time over which the driver has been continuously driving the vehicle in the embodiment.

In step S401, the length of time that has elapsed since the ignition switch was turned on in the vehicle (the length of time the driver has been driving the vehicle) is read in units of minutes. This time length is counted through timer processing (not shown). In step S402, a route search is executed to calculate a recommended route from the start point to the destination.

In step S403, a decision is made as to whether or not the length of driving time having been measured in step S401 is equal to or greater than a predetermined threshold value. The threshold value used in this processing is a reference value based upon which a decision is made by the navigation apparatus 1 as to whether or not to make a suggestion or an inquiry to the driver, as is the threshold value used in the traffic jam information display suggestion processing. The threshold value changes in correspondence to the response of the driver to the suggestion or the inquiry made by the navigation apparatus 1. In this embodiment, the threshold value is set at 120 minutes. If the length of driving time is equal to or greater than the threshold value, an affirmative decision is made in step S403 and the operation proceeds to step S404. If the length of driving time is less than the threshold value, a negative decision is made in step S403 and the operation returns to step S403.

In step S404, the navigation apparatus 1 makes an inquiry related to a suggestion to the driver through an audio message output via the speaker 17. This inquiry is made by using the inquiry message 28 stored in the suggestion database 21. In this embodiment, an audio message "Time for a rest stop?" is output through the speaker 17. In step S405, a decision is made as to whether or not the suggestion-related inquiry made by the navigation apparatus 1 has received an affirmative response. If the driver gives a negative response such as "don't need suggestions" or "no" to the inquiry, a negative decision is made in step S405, and the operation proceeds to step S406.

In step S406, the threshold value is changed to a value obtained by adding 30 minutes to the current value. Once the threshold value is thus adjusted, the inquiry related to the rest stop suggestion is not made to the driver subsequently unless the driver keeps driving continuously for an even longer period of time. At this time, the rest stop suggestion processing ends. If, on the other hand, the driver gives an affirmative oral response such as "yes" or "okay" to the inquiry, an affirmative decision is made in step S405 and the operation proceeds to step S407. As explained earlier, the driver's speech is input through the audio input unit 19 and the speech contents, recognized by the speech recognition unit 110, are output to the control unit 11.

In step S407, the current position detection device 14 detects the current position of the subject vehicle. At this time, information indicating the type of road on which the subject vehicle is currently traveling is extracted based upon the detected current position and the map data stored in the DVD-ROM 115. By using the extracted information, a decision is made in step S408 as to whether or not the road on which the subject vehicle is currently traveling is an express highway. If the subject vehicle is currently traveling on an express highway, an affirmative decision is made and the operation proceeds to step S409.

In step S409, a search for service areas located ahead of the current position on the recommended route is executed based upon the map data in the DVD-ROM 115. A negative decision is made in step S408 if the subject vehicle is not traveling on an express highway and in this case, the operation proceeds to step S410.

In step S410, a search for family restaurants located ahead of the current position on the recommended route is executed by using the map data in the DVD-ROM 115. In step S411, the service area closest to the current position among the service areas having been found through the search in step S409 or the family restaurant closest to the current position among the family restaurants found through the search in step S410 is extracted and the distance to the service area or the family restaurant is calculated.

In step S412, the navigation apparatus 1 makes an audio suggestion to the driver through the speaker 17. The suggestion is made by using the suggestion message 29 stored in the suggestion database 21. In the embodiment of the present invention, an audio message "Would you like to stop by at the next service area xx kilometers ahead?" is output through the speaker 17 if the subject vehicle is currently traveling on an express highway, whereas an audio message "Would you like to visit the family restaurant xx kilometers ahead?" is output through the speaker 17 if the subject vehicle is not traveling on an express highway. It is to be noted that "xx" indicates the numerical value indicating the distance from the current position having been calculated in step S411, which is synthesized as an audio output.

In step S413, a decision is made as to whether or not the driver has responded affirmatively to the suggestion made by the navigation apparatus 1. If the driver has responded affirmatively by saying "yes", "okay" or the like to the suggestion, and the operation proceeds to step S414. During this processing, too, the speech made by the driver is input through the audio input unit 19, and the speech contents recognized by the speech recognition unit 110 are output to the control circuit 11. In step S414, a route search is executed from a start point set at the current position to a destination set at the service area or the family restaurant and route guidance is started by providing directions on the screen display at the display monitor 16 and audio directions through the speaker 17.

In step S415, the threshold value is changed to a value obtained by subtracting 5 minutes from the current value. Once the threshold value is thus adjusted, the inquiry related to the rest stop suggestion is subsequently made after a shorter interval than the previous threshold value set for the traveling time. At this time, the rest stop suggestion processing ends. If the driver responds negatively by saying "no", "no thanks" or the like to the suggestion made in step S412, a negative decision is made in step S413 and the operation proceeds to step S416.

In step S416, the threshold value is changed to a value obtained by adding 10 minutes to the current value. A smaller value is added to the current threshold value compared to the value added in step S406, since the affirmative decision made in step S405 indicates that the driver initially responded affirmatively to the inquiry and that there is a likelihood of the driver responding affirmatively to the suggestion when a slightly greater length of time has elapsed since the ignition switch was turned on, i.e., when he has been driving continuously a little longer. Once the threshold value is adjusted, the inquiry related to the rest stop suggestion is not made unless the length of driving time further increases. At this time, the rest stop suggestion processing ends.

Figure 5:
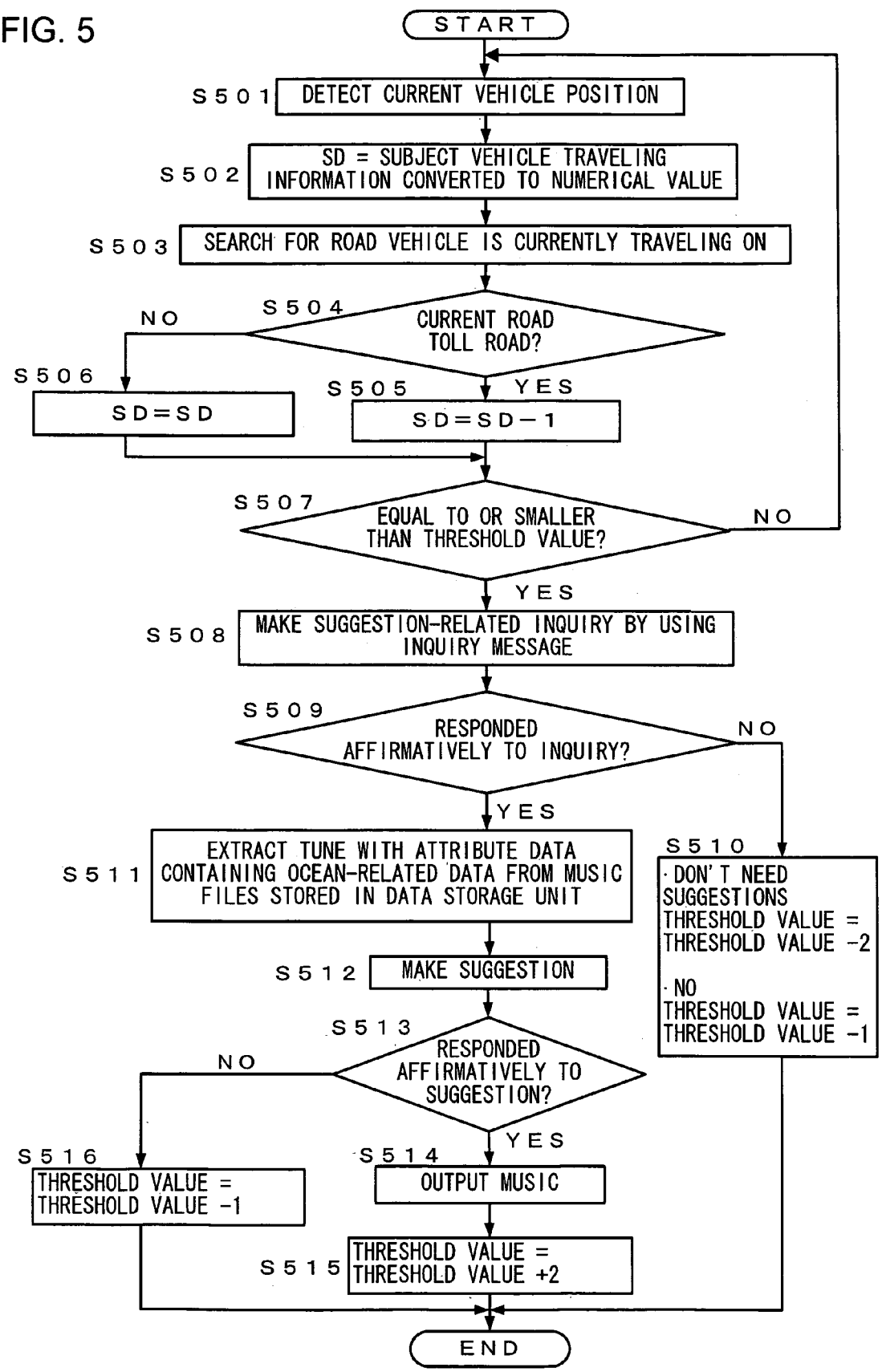
FIG. 5 presents a flowchart of the processing executed to suggest surf music.

Next, the contents of surf music suggestion processing are explained in reference to the flowchart presented in FIG. 5. The navigation apparatus 1 executes this suggestion processing to make a suggestion and an inquiry to the driver with regard to music related to the ocean as the vehicle approaches the ocean.

In step S501, the current position of the subject vehicle is detected by the current position detection apparatus 14. In the following step S502, data indicating the distance to the ocean are extracted from the link information corresponding to the link on which the subject vehicle is present, which is contained in the road data stored in the DVD-ROM 115, based upon the detected current position. At this time, the subject vehicle traveling information (the distance from the ocean) is converted to a numerical value by using a numerical conversion table stored in the data storage unit 113, and the numerical value is used to substitute a variable SD.

In reference to FIG. 6, the numerical conversion table is explained. The numerical conversion table 61 is used to convert the subject vehicle traveling information to a numerical value based upon the value indicating the distance from the ocean, which is included in the link information in the road data. The numerical conversion table is constituted with data 62 indicating varying distances from the ocean and numerical values 63 representing subject vehicle traveling information as numerical values. As the data 62 indicating the distances from the ocean, varying distances 64*a* through 64*d* from a specific ocean are stored, whereas a numerical values 65*a* through 65*d* each corresponding to one of the distances 64*a* through 64*d* from the specific ocean are stored as the numerical values 63. By using this numerical conversion table 61, the subject vehicle traveling information indicating that "the subject vehicle is currently traveling at a point away from the ocean by a specific distance" is converted to a numerical value. Next, in step S503, the information indicating the type of road on which the subject vehicle is currently traveling is obtained based upon the detected current position and the map data stored in the DVD-ROM 115.

In step S504, a decision is made as to whether or not the road on which the subject vehicle is currently traveling is a toll road. An affirmative decision is made if the subject vehicle is currently traveling on a toll road and, in this case, the operation proceeds to step S505.

In step S505, 1 is subtracted from the numerical value (SD) having resulted from the conversion of the subject vehicle traveling information executed in step S502 by using the numerical conversion table 61, since driving on a toll road is not as stressful as driving on a regular road and thus, the driver is likely to feel relaxed enough to listen to surf music. If, on the other hand, the subject vehicle is not traveling on a toll road, a negative decision is made in step S504, and the operation proceeds to step S506. In step S506, the SD value obtained through the conversion executed in step S502 by using the numerical conversion table 61 its retained.

In step S507, a decision is made as to whether or not the value SD indicating the traveling information as a numerical value, which has been set in step S505 or step S506, is equal to or smaller than a predetermined threshold value. The threshold value is used as a reference value when the navigation apparatus 1 makes a decision as to whether or not to make a suggestion or an inquiry to the driver and the threshold value is changed in correspondence to the response of the driver to the suggestion or the inquiry made by the navigation apparatus 1, as in the case of the threshold value used in the traffic jam information display suggestion processing. In this embodiment, the threshold value is set to 2. If the numerical value SD representing the traveling information, which has been obtained in step S505 or step S506, is equal to or smaller than the threshold value, an affirmative decision is made in step S507 and the operation proceeds to step S508. If, on the other hand, the value SD representing the traveling information as a numerical value, which has been obtained in step S505 or step S506, is greater than the threshold value, a negative decision is made in step S507 and the operation returns to step S501.

In step S508, the navigation apparatus 1 makes an inquiry related to a suggestion to the driver through an audio message output via the speaker 17. This inquiry is made by using the inquiry message 28 stored in the suggestion database 21. In this embodiment, an audio message "We are traveling near the ocean. Would you like to hear some surf music?" is output through the speaker 17.

In step S509, a decision is made as to whether or not the suggestion-related inquiry made by the navigation apparatus 1 has received an affirmative response. If the driver gives a negative response such as "don't need suggestions" or "no" to the inquiry, a negative decision is made in step S509, and the operation proceeds to step S510. In this case too, the contents of the driver's speech are input through the audio input unit 19 and the contents recognized by the speech recognition unit 110 are output to the control circuit 11.

In step S510, the threshold value is changed to a value obtained by subtracting 2 from the current value if the driver has said "don't need any suggestions," whereas the threshold value is changed to a value obtained by subtracting 1 from the current value if the driver has said "no". Once the threshold value is adjusted, no further inquiry related to the surf music suggestion is made subsequently unless the subject vehicle travels even closer to the ocean. At this time, the surf music suggestion processing ends. If the driver responds affirmatively to the inquiry by saying "yes" or "okay" an affirmative decision is made in step S509 and the operation proceeds to step S511.

In step S511, a tune among tunes in correspondence to which data related to the ocean are stored as attribute data is extracted from the music files stored in the data storage unit 113. In step S512, the navigation apparatus 1 makes an audio suggestion to the driver through the speaker 17. The audio message is output through the speaker 17. This suggestion is made by using the suggestion message 29 stored in the suggestion database 21. In the embodiment of the present invention, an audio message "Would you like to listen to xx (title of tune)?" is output through the speaker 17. It is to be noted that "xx" indicates the title of the tune extracted in step S511, which is synthesized as an audio output.

In step S513, a decision is made as to whether or not the driver has responded affirmatively to the suggestion made by the navigation apparatus 1. If the driver has responded affirmatively by saying "yes", "okay" or the like to the suggestion, the operation proceeds to step S514. During this processing, too, the speech made by the driver is input through the audio input unit 19, and the speech contents are recognized by the speech recognition unit 110. In step S514, the tune having been extracted in step S511 is output through the speaker 17.

In step S515, the threshold value is changed to a value obtained by adding 2 to the current value. After the threshold value is thus adjusted, the inquiry related to the surf music suggestion is made even when the subject vehicle is traveling at a point further away from the ocean than the distance corresponding to the previous threshold value. At this time, the surf music suggestion processing ends. If the driver responds negatively by saying "no" or "no thanks" to the suggestion made in step S512, a negative decision is made in step S513 and the operation proceeds to step S516. Instep S516, the threshold value is changed to a value obtained by subtracting 1 from the current value. At this time, surf music suggestion processing ends.

Figure 7:
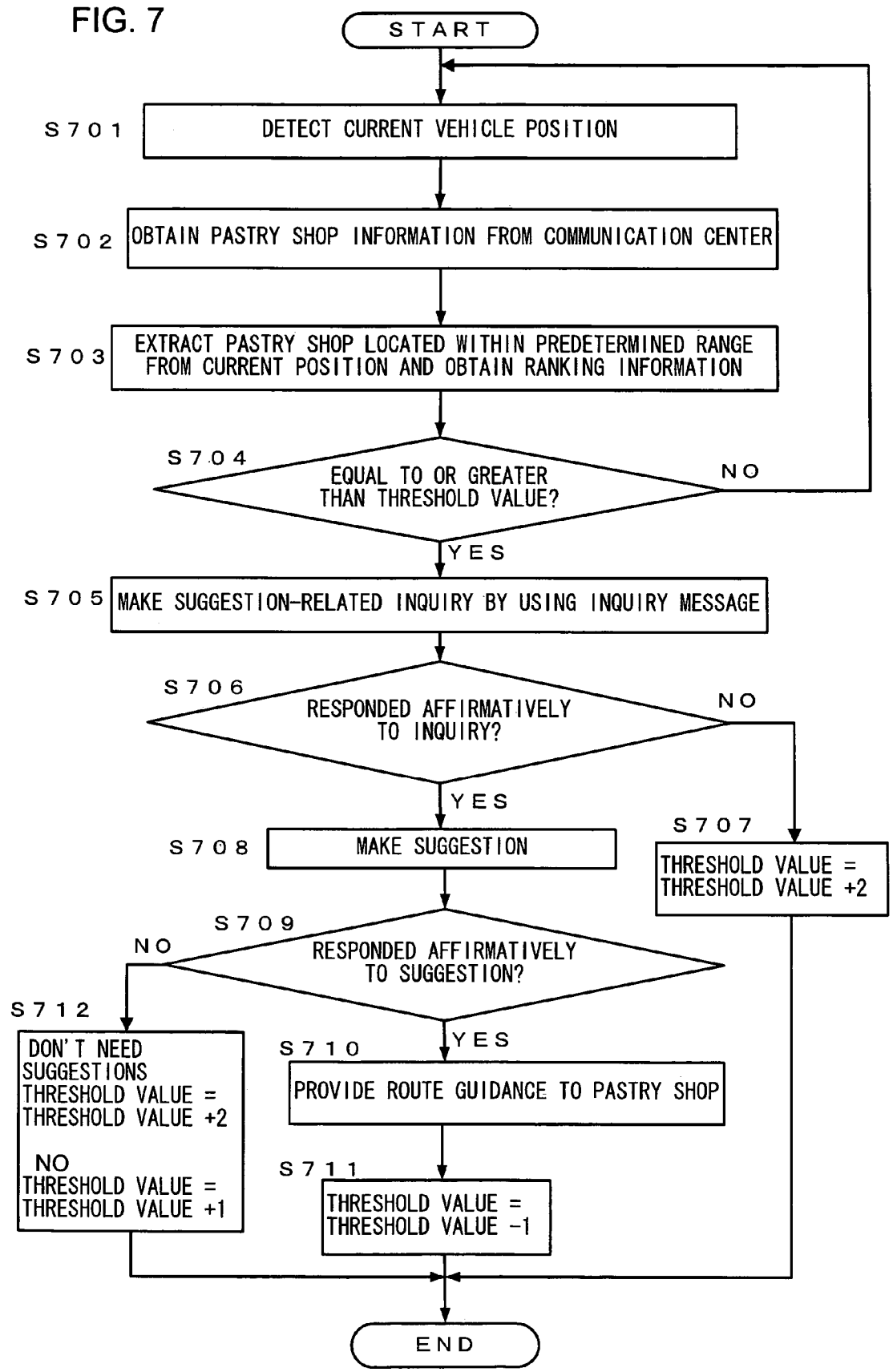
FIG. 7 presents a flowchart of the processing executed to suggest a pastry shop.

Next, pastry shop suggestion processing is explained in reference to the flowchart presented in FIG. 7. The navigation apparatus 1 executes this suggestion processing to make a suggestion or an inquiry with regard to a visit to a newly opened pastry shop while the vehicle travels in the vicinity of the pastry shop.

In step S701, the current position of the subject vehicle is detected by the current position detection device 14. In the next step, S702, new pastry shop information (information on newly opened pastry shops) is obtained from pastry shop information having been transmitted from the communication center and received via the communication unit 114. At this time, a pastry shop located within a predetermined range from the detected current position among the newly opened pastry shops is extracted and information indicating the rating of the pastry shop is obtained from the pastry shop information having been received. The rating of the pastry shop in this context refers to the grade awarded to the pastry shop by a food critic or a pastry shop enthusiast who publishes his ratings of various pastry shops. Pastry shops are rated in a five-level system with level 5 awarded to the best pastry shops and the poorest pastry shops rated as level 1.

In step S704, a decision is made as to whether or not the rating having been extracted in step S703 is higher than a predetermined threshold value. The threshold value is used as a reference value when the navigation apparatus 1 makes a decision as to whether or not to make a suggestion or an inquiry to the driver and the threshold value is changed in correspondence to the response of the driver to the suggestion or an inquiry made by the navigation apparatus 1, as in the case of the threshold value used in the traffic jam information display suggestion processing. In this example, the threshold value compared against the rating is set to 3. If the rating having been extracted in step S703 is equal to or higher than the threshold value, an affirmative decision is made in step S704 and the operation proceeds to step S705. If, on the other hand, the rating having been extracted in step S703 is lower than the threshold value, a negative decision is made in step S704 and the operation returns to step S701.

In step S705, the navigation apparatus 1 makes an inquiry related to a suggestion to the driver through an audio message output via the speaker 17. This inquiry is made by using the inquiry message 28 stored in the suggestion database 21. In this embodiment of the present invention, an audio message "Would you like to try a new pastry shop in the neighborhood?" is output through the speaker 17.

In step S706, a decision is made as to whether or not the driver has responded affirmatively to the suggestion-related inquiry made by the navigation apparatus 1. A negative decision is made in step S706 if, the driver has responded negatively by saying "no" or "no thanks" to the inquiry and in this case, the operation proceeds to step S707. As explained earlier, the contents of the driver's speech are input via the audio input unit 19 and speech recognition is executed by the speech recognition unit 110. In step S707, the threshold value is changed to a value obtained by adding 2 to the current value. Once the threshold value is thus adjusted, no further inquiry related to the pastry shop suggestion is made unless there is a pastry shop with a higher rating. At this time, the pastry shop suggestion processing ends. If, on the other hand, the driver has responded affirmatively by saying "yes", "okay" or the like, an affirmative decision is made in step S706, and the operation proceeds to step S708.

In step S708, the navigation apparatus 1 makes an audio suggestion to the driver through the speaker 17. This suggestion is made by using the suggestion message 29 stored in the suggestion database 113. In the embodiment of the present invention, an audio message "Would you like to try xx (the name of a pastry shop)?" is output through the speaker 17. It is to be noted that "xx" (the name of a pastry shop) is the name of the pastry shop having been extracted in step S702, which is synthesized as an audio output.

In step S709, a decision is made as to whether or not the driver has responded affirmatively to the suggestion made by the navigation apparatus 1. If the driver has responded affirmatively by saying "yes", "okay" or the like to the suggestion and the operation proceeds to step S710. During this processing, too, the driver's speech input through the audio input unit 19 is recognized by the speech recognition unit 110.

In step S710, a route search is executed to determine a route from a start point set at the current position to a destination set at the pastry shop and route guidance to the pastry shop is provided. At this time, the operation proceeds to step S711 to set a value obtained by subtracting 1 from the current value as a new threshold value. After the threshold value is thus adjusted, the inquiry related to the pastry shop suggestion is made for newly opened pastry shops with lower ratings. The pastry shop suggestion processing then ends.

If the driver has responded negatively by saying "don't need suggestions" or "no" to the suggestion made in step S708, a negative decision is made in step S709, and the operation proceeds to step S712. In step 712, the threshold value is changed to a value obtained by adding 2 to the current value if the driver has said "don't need suggestions" or to a value obtained by adding 1 to the current value if the driver has said "no". Once the threshold value is adjusted, unless there is a pastry shop with a higher rating, no further inquiry related to the pastry shop suggestion is made. At this time, the pastry shop suggestion processing ends.

The navigation apparatus 1 in the embodiment of the present invention achieves the following advantages.

(1) The threshold values each used as a reference when making a decision as to whether or not the navigation apparatus 1 is to make an inquiry or a suggestion is adjusted in correspondence to the driver's response to the inquiry or the suggestion. Thus, inquiries and suggestions are made only in appropriate situations and the navigation apparatus does not make unsuitable inquiries or suggestions. This means that inquiries and suggestions suitable to specific conditions under which the driver is operating the vehicle can be made. In the pastry shop suggestion processing, for instance, a driver who does not care for pastries will keep saying "no" to pastry shop inquiries. As a result, the threshold value eventually becomes greater than five. Since the highest value of the rating awarded to pastry shops is five, no further inquiries related to pastry shop suggestions will be made. Thus, no further inquiries or suggestions that are not suitable for this particular driver are made. Consequently, only the types of suggestions suitable for the driver will be left to allow the navigation apparatus 1 to make inquiries and suggestions that are likely to fit the driver's needs.

(2) The threshold value used as a reference in the decision-making process is adaptively adjusted in correspondence to the response of the driver to an inquiry or a suggestion so as to match the driver's preference. In the traffic jam information display suggestion processing, for instance, a lower threshold value will be set if the driver tends to worry about even slight traffic congestion, while a larger threshold value will be set for a driver who is not bothered by slight congestion. Thus, inquiries and suggestions can be made to the driver in a manner that reflects his personal tastes.

(3) The threshold value is adjusted by varying extents in correspondence to the driver response "don't need suggestions" and the driver response "no" to an inquiry or a suggestion made by the navigation apparatus 1. As a result, an optimal value is adaptively set for the threshold value used for reference when making a decision as to whether or not to make and inquiry or suggestion to the driver.

(4) The threshold value is adjusted to varying extents in correspondence to a negative response to an inquiry and a negative response to a suggestion. This makes it possible to set an optimal value for the threshold value used as a reference when making a decision as to whether or not to make an inquiry or a suggestion to the driver.

While the threshold values used for reference when making a decision as to whether or not to make an inquiry are each adjusted in correspondence to the driver response in the embodiment explained above, the threshold values may instead be adjusted through a driver operation. An adjustment of a threshold value through a driver operation is now explained in reference to FIGS. 8A through 8D. FIGS. 8A through 8D show display screens that may be brought up on the display monitor 16.

Figure 8A:
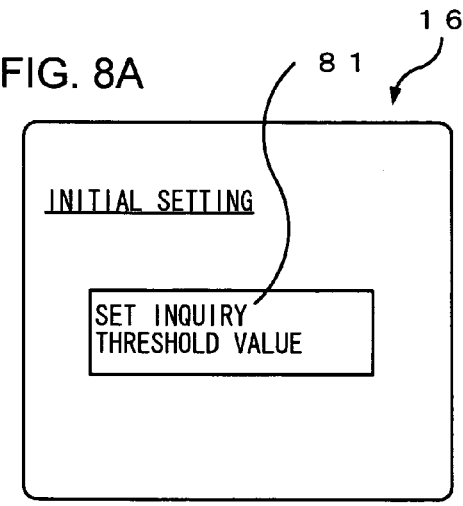
FIGS. 8A through 8D show how the threshold values may be adjusted through driver operation.

FIG. 8A shows an initial setting screen brought up by the navigation apparatus 1, which includes an inquiry threshold value setting button 81. As the driver selects the inquiry threshold value setting button 81, buttons corresponding to the suggestion items, i.e., a traffic jam information display button 82, a rest stop button 83, a surf music button 84 and a pastry shop button 85 are brought up on display, as shown in FIG. 8B. As one of the buttons 82 through 85 is selected, a threshold value adjustment screen corresponding to the particular suggestion item is brought up on display. An explanation is given on an example in which the traffic jam information display button 82 has been selected.

Figure 8C:
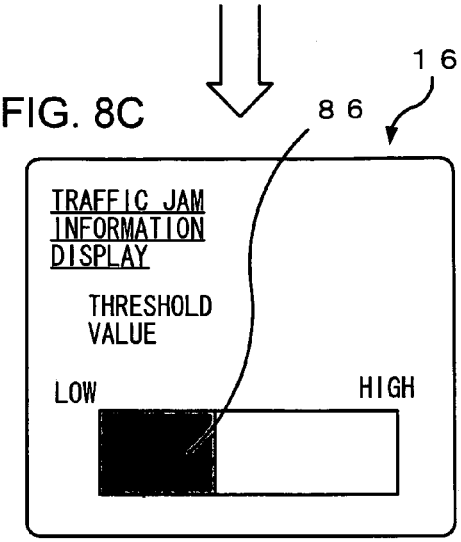
Figure 8B:
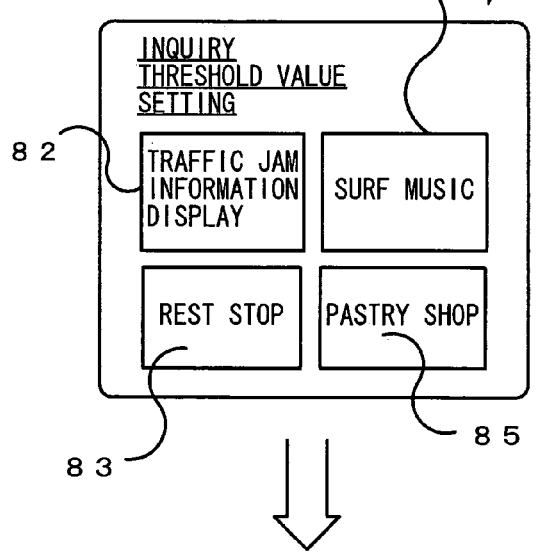
Figure 8D:
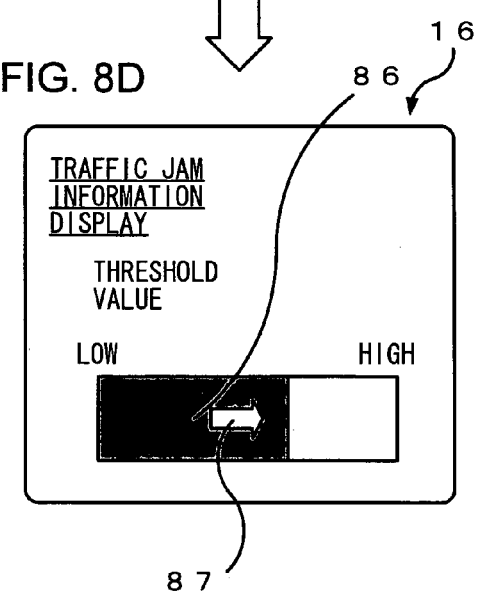

As the traffic jam information display button 82 is selected, a threshold value adjustment bar 86 is brought up on display, as shown in FIG. 8C. By operating the manual input unit 18, the threshold value can be adjusted to a higher value or a lower value at the threshold adjustment bar 86. For instance, the threshold value adjustment bar 86 is pulled in the direction indicated by an arrow 87 through an operation of the manual input unit 18, as shown in FIG. 8D to raise the threshold value.

Since the threshold value can be adjusted through a manual operation in this case, the threshold value can be set to a value desired by the driver so as to allow the navigation apparatus 1 to make inquiries and suggestions suitable to specific situations.

While the navigation apparatus 1 achieved in the embodiment makes both inquiries and suggestions, it may instead make either inquiries or suggestions alone.

An example in which the navigation apparatus 1 makes inquiries alone is now explained in reference to FIG. 9. FIG. 9 presents a flowchart of traffic jam information display inquiry processing.

In step S901, the navigation apparatus 1 executes a route search to determine a route from the start point to the destination and calculates a recommended route. In step S902, it receives VICS information via the VICS information reception unit 111 and obtains information contained in the VICS information, which corresponds to any block on the recommended route where the traffic is congested. In step S903, the ratio (%) of the congested block to the entire length of the recommended route extending from the start point to the destination is calculated.

In step S904, a decision is made as to whether or not the ratio of the congested block calculated in step S903 is equal to or greater than a predetermined threshold value. In this example, the threshold value is set at 50%. If the ratio of the congested block is equal to or greater than the threshold value, an affirmative decision is made in step S904 and the operation proceeds to step S905. If, on the other hand, the ratio of the congested block is smaller than the threshold value, a negative decision is made and the operation returns to step S902.

In step S905, the navigation apparatus 1 makes an inquiry related to a suggestion to the driver through an audio message output via the speaker 17. This inquiry is made by using an inquiry message stored in advance in the suggestion database 21. In this example, an audio message "The ratio of congested block is xx %. Do you want traffic jam information to be displayed?" is output through the speaker 17. It is to be noted that "xx" indicates the numerical value indicating the ratio of the congested block having been calculated in step S903 and is synthesized as speech.

In step S906, a decision is made as to whether or not the suggestion-related inquiry made by the navigation apparatus 1 has received an affirmative response. If the driver gives a negative response such as "no" or "no thanks" to the inquiry, a negative decision is made in step S906, and the operation proceeds to step S907. It is to be noted that the contents of the driver's speech are analyzed by the speech recognition unit 110, and the recognition results are output to the control circuit 11. If, on the other hand, the driver responds affirmatively by saying "yes" or "okay" to the inquiry, an affirmative decision is made in step S906 and the operation proceeds to step S908.

In step S908, the threshold value is changed to a value obtained by subtracting 5% from the current value. In step S907, the threshold value is changed to a value obtained by adding 5% to the current value. After the threshold value is adjusted in step S907, no further inquiry related to the traffic jam information display suggestion is made subsequently unless the ratio of the congested block increases. After the threshold value is adjusted in step S908, the inquiry related to the traffic jam information display suggestion is subsequently made even when the ratio of the congested block is smaller. The traffic jam information display suggestion processing then ends.

The navigation apparatus 1 in this embodiment does not make a suggestion and accordingly, it does not display traffic jam information at the display monitor 16. Instead, if the driver having received the display inquiry feels it necessary to bring up the traffic jam information on display, he displays the traffic jam information by operating the manual input unit 18. In this situation, the traffic jam information may be brought up on display in response to the driver's instructions issued through the audio input unit 19, instead.

As explained above, when the navigation apparatus 1 makes inquiries only, the threshold values each used as a reference when the navigation apparatus 1 makes a decision as to whether or not to make an inquiry are adjusted in correspondence to the response of the driver to the inquiry. As a result, an inquiry suitable in a specific situation is made to allow the driver to take appropriate action under the particular circumstances.

Figure 10:
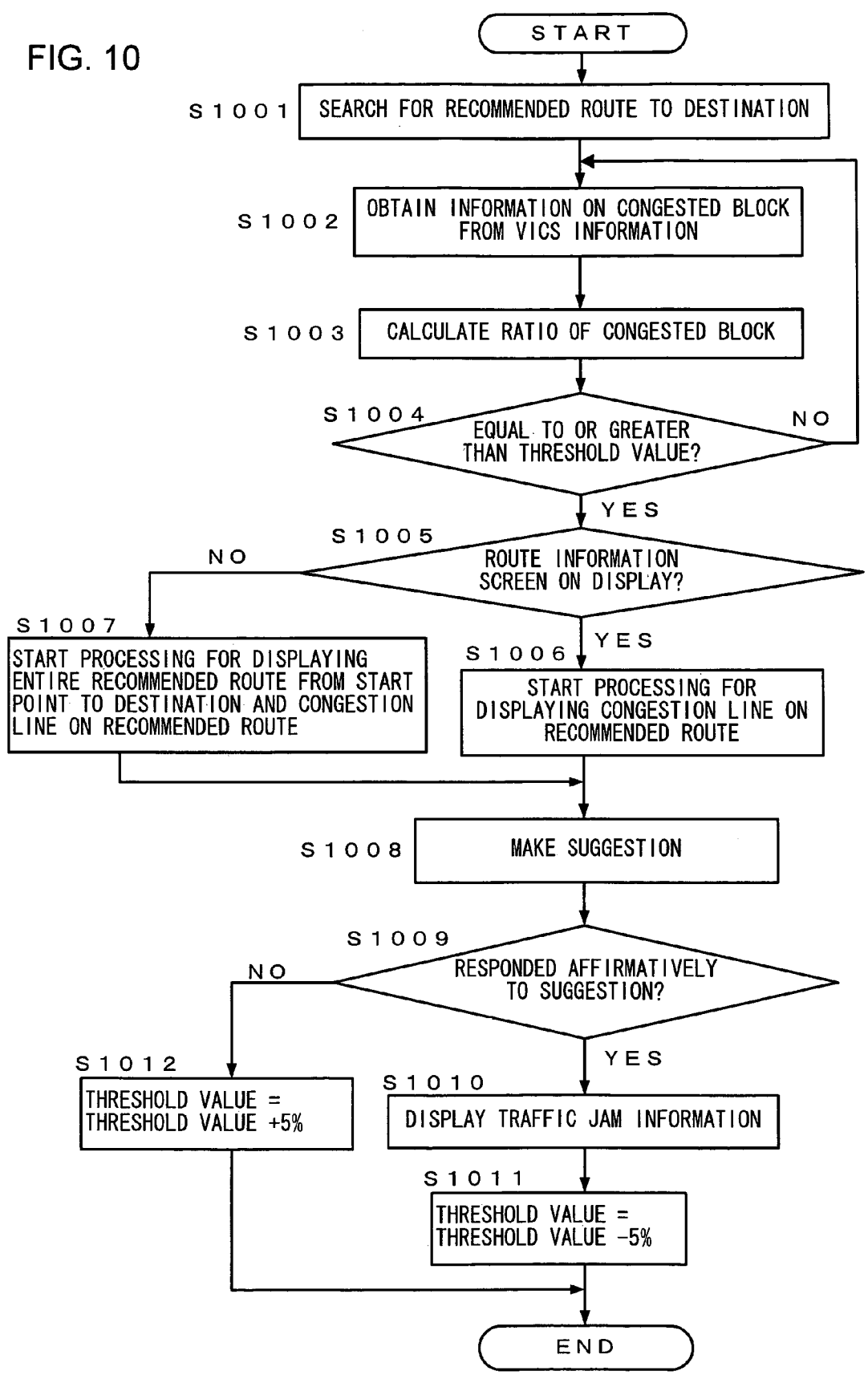
FIG. 10 presents a flowchart of the processing executed simply to suggest a traffic jam information display.

Next, processing that may be executed in the navigation apparatus 1 to make suggestions only is explained in reference to FIG. 10. FIG. 10 presents a flowchart of processing executed to make a traffic jam information display suggestion alone.

In step S1001, the navigation apparatus 1 executes a route search to determine a route from the start point to the destination and calculates the recommended route. In step S1002, it receives VICS information via the VICS information reception unit 111 and obtains information contained in the VICS information, which corresponds to any block on the recommended route where the traffic is congested. In step S1003, the ratio (%) of the congested block to the entire length of the recommended route from the search results, extending from the start point to the destination is calculated.

In step S1004, a decision is made as to whether or not the ratio of the congested block calculated in step S1003 is equal to or greater than a predetermined threshold value. In this example, the threshold value is set at 50%. If the ratio of the congested block is equal to or greater than the threshold value, an affirmative decision is made in step S1004 and the operation proceeds to step S1005. If, on the other hand, the ratio of the congested block is smaller than the threshold value, a negative decision is made and the operation returns to step S1002.

In step S1005, a decision is made as to whether or not the screen currently on display at the display monitor 16 is a route information display screen showing the route from the start point to the destination having been determined through the search. If an affirmative decision is made, the operation proceeds to step S1006 to start processing for displaying a congestion line along the congested block on the searched route on display. If, on the other hand, a surrounding area map display screen of an area around the, subject vehicle is currently on display at the display monitor 16, a negative decision is made in step S1005 and the operation proceeds to step S1007. In step S1007, the processing for displaying the searched route extending from the start point to the destination with the congestion line along the congested block starts. A congestion line similar to that explained earlier is displayed through this processing.

In step S1008, the navigation apparatus 1 makes an audio suggestion to the driver through the speaker 17. This suggestion is made by using the suggestion message 29 stored in the suggestion database 21 in advance. In this embodiment the audio message "Do you want traffic jam information to be displayed?" is output through the speaker 17.

In step S1009, a decision is made as to whether or not the driver has responded affirmatively to the suggestion made by the navigation apparatus 1. If the driver has responded affirmatively by saying "yes", "okay" or the like to the suggestion, an affirmative decision is made in step S1009 and the operation proceeds to step S1010. During this processing, too, the speech made by the driver is input through the audio input unit 19 and is recognized by the speech recognition unit 110. In step S1010, the recommended route from the start point to the destination, which includes the congestion line indicating the congested block is displayed at the display monitor 16, thereby providing the driver with traffic jam information. At this time, the operation proceeds to step S1011 in which the threshold value is changed to a value obtained by subtracting 5% from the current value. Once the threshold value is adjusted in this step, the suggestion related to the traffic jam information display is made subsequently even when the ratio of the congested block is less than the current threshold value. The traffic jam information display suggestion processing then ends.

If the driver responds negatively by saying "no", "no thanks" or the like to the suggestion made in step S1008, a negative decision is made in step S1009 and the operation proceeds to step S1012. In step S1012, the threshold value is changed to a value obtained by adding 5% to the current value. Once the threshold value is thus adjusted, no further suggestion for traffic jam information display is made subsequently unless the ratio of the congested block increases. At this time, the traffic jam information display suggestion processing ends.

Even when the navigation apparatus 1 is to make suggestions only, as described above, the threshold value used as reference for making a decision as to whether or not to make a suggestion is adjusted in correspondence to the response of the driver to the, suggestion. As a result, a suggestion suitable to the current conditions of the driver can be made to the driver. In particular, since the suggestion processing is executed immediately by skipping the inquiry processing, a quick response from the driver is assured.

While suggestions made in the embodiments are a traffic jam information display suggestion, a rest stop suggestion, a surf music suggestion and a pastry shop suggestion, the present invention is not limited to these examples. The suggestions that may be made can be increased or altered as necessary. In addition, information other than pastry shop information may be received at the communication unit 114 from the communication center. For instance, shop information on shops other than pastry shops, facility information, weather information, leisure activity information, tourist guide information, holiday information, sports information, music information, art information, movie information or the like may be received from the communication center. Also, the VICS information received at the VICS information reception unit 110 does not need to be traffic jam information and heavy traffic information, traffic accident information, snowy road information or temporary traffic control information may be received. Moreover, the range over which each threshold value is adjusted in correspondence to the driver response is not limited to that explained in reference to the embodiments.

While the navigation apparatus makes inquiries and suggestions suitable to a specific driver under given circumstances in the embodiments described above, the navigation apparatus may include a plurality of suggestion databases 21 so as to make suitable inquiries and suggestions to a plurality of drivers in an opportune manner.

While a given threshold value is adjusted each time the driver responds to a suggestion or inquiry in the embodiment, the present invention is not limited to this example. For instance, the threshold value may be changed when the driver gives the same response repeatedly, e.g., the threshold value may be adjusted after the driver responds affirmatively to the suggestion twice in a row.

In the embodiments described above, specific suggestions are made when numerical values representing specific information are greater than the corresponding threshold values in the traffic jam information display suggestion processing, the rest stop suggestion processing and the pastry shop suggestion processing, and a suggestion is made when a numerical value representing specific information is smaller than the threshold value in the surf music suggestion processing. Instead, the definition of the numerical value used in the surf music suggestion processing may be altered so as to make the specific suggestion when the numerical value is greater than the threshold value. In such a case, the direction in which the threshold value is adjusted is reversed as well.

Alternatively, the definition of the numerical values used in the traffic jam information display suggestion processing, the rest stop suggestion processing and the pastry shop suggestion processing may be reversed. In such a case, the direction along which the threshold values are adjusted, too, is reversed. Namely, any definition may be adopted with regard to the numerical values used in the embodiments, as long as each threshold value is adjusted so as to make a subsequent suggestion less readily when the driver responds negatively to the initial suggestion. Accordingly, it is understood that the present invention having been described as making a specific suggestion when the numerical value is greater than the threshold value for convenience actually covers the concept of making a specific suggestion when the numerical value is smaller than the threshold value.

An explanation is given above in reference to the embodiments by using two terms "suggestion" and "inquiry". The inquiry, however, may be regarded as part of the suggestion. Namely, the inquiry may be regarded as a preliminary or rough suggestion and the suggestion may be regarded as a specific suggestion.

While an explanation is given above in reference to the embodiments in which the present invention is adopted in the navigation apparatus 1 installed in a vehicle, the present invention is not limited to this example. The present invention may be adopted in, for instance, a portable navigation apparatus that can be carried by a person while walking. It may also be adopted in a portable telephone with a navigation function. In short, the present invention may be adopted in all types of apparatuses capable of making various suggestions through navigation processing.

The control program executed in the navigation apparatus 1 described above may be installed in a personal computer to enable the personal computer to function as the navigation apparatus. In such a case, the control program that allows the personal computer to function as the navigation apparatus can be provided in a recording medium such as a DVD or a CD-ROM, or through a data signal on the Internet or the like. Thus, the control program that realizes a navigation apparatus with the features described above can be distributed as a computer-readable computer program product adopting any of various modes including a recording medium and a carrier wave. In addition, the program executed in the update map data distribution center 4, too, can be distributed as a computer-readable computer program product adopting any of various modes including a recording medium and a carrier wave.

The above described embodiments are examples and various modifications can be made without departing from he spirit and scope of the invention.

What is claimed is:

1. A navigation apparatus comprising:
a numerical conversion unit that converts information related to a specific suggestion to a numerical value;
a suggestion unit that makes the specific suggestion to a user when the numerical value resulting from numerical conversion executed by the numerical conversion unit is greater than a threshold value;
an input unit through which a user response to the specific suggestion is input; and
an adjustment unit that changes the threshold value in correspondence to contents of the user response input through the input unit.

2. A navigation apparatus according to claim 1, wherein:
the adjustment unit adjusts the threshold value to different values in correspondence to an affirmative user response and a negative user response to the specific suggestion.

3. A navigation apparatus according to claim 2, wherein:
in case that the user gives an affirmative response to the specific suggestion, the adjustment unit changes the threshold value to a smaller value and in case that the user gives a negative response to the specific suggestion, the adjustment unit changes the threshold value to a greater value.

4. A navigation apparatus according to claim 1, wherein:
the specific suggestion includes a first suggestion and a second suggestion that is more specific than the first suggestion; and
the suggestion unit first makes the first suggestion and makes the second suggestion following the first suggestion.

5. A navigation apparatus according to claim 4, wherein:
the threshold value is adjusted to different values in correspondence to the user response to the first suggestion and the user response to the second suggestion.

6. A navigation apparatus according to claim 1, wherein:
the information related to the specific suggestion is at least either of vehicle traveling information and external information transmitted from an external source.

7. A navigation apparatus according to claim 6, wherein:
the vehicle traveling information indicates at least either of a distance between the current vehicle position and a specific geographical position and a length of required traveling time to the geographical position.

8. A navigation apparatus according to claim 6, wherein:
the external information transmitted from the external source is traffic information, shop information or facility information.

9. A navigation apparatus according to claim 6, further comprising:
a route search unit that searches for a recommended route from a start point or a current position to a destination, wherein:
the external information is information related to a congested block on the recommended route;
the numerical value resulting from the numerical conversion executed by the numerical conversion unit indicates a ratio of the congested block to the recommended route; and
the specific suggestion relates to a traffic jam information display providing traffic jam information along the recommended route.

10. A navigation apparatus according to claim 6, further comprising:
   a route search unit that searches for a recommended route from a start point or a current position to a destination, wherein:
   the vehicle traveling information indicates a length of time over which the user, who is a driver, has been driving the vehicle;
   the numerical value resulting from the numerical conversion executed by the numerical conversion unit indicates the length of time over which the driver has been driving the vehicle; and
   the specific suggestion is a suggestion related to a rest stop on the recommended route.

11. A navigation apparatus according to claim 1, further comprising:
   a response recognition unit that recognizes an extent of rejection when the user gives a negative response to the specific suggestion, wherein:
   the adjustment unit changes the threshold value to a greater value when the extent of rejection recognized by the response recognition unit is greater.

12. A navigation apparatus according to claim 1, further comprising:
   a manual adjustment unit that allows the user to adjust the threshold value.

* * * * *